United States Patent [19]

Baldwin et al.

[11] Patent Number: 4,519,913

[45] Date of Patent: May 28, 1985

[54] PROCESS FOR THE REMOVAL AND RECOVERY OF SELENIUM FROM AQUEOUS SOLUTIONS

[75] Inventors: Roger A. Baldwin, Oklahoma City; John C. Stauter, Edmond; Jim W. Kauffman, Edmond; William C. Laughlin, Edmond, all of Okla.

[73] Assignee: Kerr-McGee Corporation, Oklahoma City, Okla.

[21] Appl. No.: 616,417

[22] Filed: Jun. 1, 1984

[51] Int. Cl.$^3$ .............................................. C02F 3/34
[52] U.S. Cl. .................................... 210/611; 210/616; 210/912
[58] Field of Search ................ 210/610, 611, 615–618, 210/912, 913

[56] References Cited

U.S. PATENT DOCUMENTS 4,332,904  6/1982  Kurane et al. ................... 210/611 X
4,405,464  9/1983  Baldwin et al. .

OTHER PUBLICATIONS

"Removal of Selenium from Drinking Water–State of the Art", Thomas J. Sorg and Gary S. Logdson; *Symposium on Selenium–Tellurium in the Environment*, 5/11-13, 1976, pp. 114-128.

*Primary Examiner*—Thomas Wyse
*Attorney, Agent, or Firm*—William G. Addison; John P. Ward

[57] ABSTRACT

A process is provided for reducing the concentration of water soluble ionic selenium species in aqueous waste solutions containing the same. The process comprises passing said waste solution through a treatment zone containing a porous matrix on which are retained populations of at least one bacteria of the genus Clostridium. The passing of said aqueous solution through said treatment zone is carried out at predetermined rates of flow, and contact between said solution and said bacteria is conducted under anaerobic conditions and at predetermined pH and temperature levels. The process provides for the conversion of the water soluble ionic selenium species to water insoluble selenium metal, which metal is retained on the porous matrix and can be recovered therefrom.

19 Claims, No Drawings

PROCESS FOR THE REMOVAL AND RECOVERY OF SELENIUM FROM AQUEOUS SOLUTIONS

CROSS-REFERENCE TO RELATED APPLICATIONS

Aspects of the present invention are related to subject matter disclosed in co-pending applications entitled "PROCESS FOR THE REMOVAL OF SULFATE AND METALS FROM AQUEOUS SOLUTIONS", Ser. No. 616,416, and "PROCESS FOR THE REMOVAL AND RECOVERY OF HEAVY METALS FROM AQEUOUS SLUTIONS", Ser. No. 616,415, both co-pending applications filed on an even date herewith and both assigned to the same assignee as the present invention.

FIELD OF THE INVENTION

The present invention relates to a process for reducing the concentration of water soluble ionic selenium species in aqueous solutions. More particularly, the present invention relates to a process for the removal of selenium ions from aqueous streams such as spent leaching solutions or mine discharge waters prior to the discarding of such streams into, for example, groundwater systems. The invention also provides for the recovery of selenium, as metallic selenium, which subsequently can be converted to useful selenium products.

BACKGROUND OF THE INVENTION

Pollution and pollution control have become increasingly more important in recent years as a result of an increased awareness and understanding of the adverse impact that pollution can have on the environment. Environmental pollution is but one consequence of industrialization and, in addition to causing a continuing deterioration in the quality of the natural environment, represents both real and potential health hazard to mankind.

Water being the essential resource that it is, industrial pollution of our water supplies has become one of our greatest concerns. Any use of water nearly always results in a decrease in the quality of the water through the addition of pollutants. These pollutants can comprise dissolved inorganic and organic chemicals, inorganic and organic particulate material and absorbed gases. Several methods have been developed and are available for removing such pollutants. These include such processes as gravity sedimentation, flotation, filtration, ion exchange, activated adsorption, reverse osmosis, electrodialysis, distillation and chemical precipitation. However, as successful as these processes may be, there exist several soluble inorganic pollutants that generally are not removable by the above enumerated methods, an example of which is selenium.

Stringent standards for the maximum level of pollutants in water to be used for drinking or to be released into groundwater systems have been or are being promulgated by both federal and state environmental agencies. For example, the current allowable maximum concentration for selenium in drinking water set by federal standards is 0.01 milligrams per liter. On the other hand, the State of New Mexico has set a selenium standard of 0.05 milligrams per liter for water discharged into the groundwater systems of that state.

An increase in pollutant concentration is, in itself, not significant, provided that methods are available for reducing the pollutant concentration to acceptable levels. One method employed to remove or substantially reduce the concentration of soluble inorganic pollutants such as heavy metals in water is chemical precipitation of the metals as either their oxides or their hydroxides. This precipitation generally is affected by the addition of lime, alum or an iron salt to the water at an appropriate pH.

Other treatment methods, such as ion exchange, reverse osmosis, electrodialysis or distillation, also can be effective in removing various pollutants. However, these methods are considerably more expensive and generally narrower in applicable scope than is desirable for the treatment of great volumes of water as is necessitated in many industrial operations.

It is known that selenium ions can be removed from aqueous systems employing chemical precipitation if the selenium is present in the selenite or Se(IV) oxidation state. Generally, such precipitation methods comprise treating the selenite-containing aqueous system with an iron salt, such as ferric or ferrous sulfate, chloride or hydroxide, or with aluminum or zinc in some appropriate form such as a power, granules or the like. However, such chemical precipitation methods provide only very limited removal of selenium when it is present in the selenate or Se(IV) oxidation state. Therefore, when present in the selenate oxidation state, selenium removal generally is affected by either ion exchange or reverse osmosis. See Thomas J. Sorg and Gary S. Logsdon, "Removal of Selenium From Drinking Water", *Proceedings of the Symposium on Selenium-Tellurium in the Environment*, pp. 114–128, May 11–13 (1976).

A recent U.S. Patent, U.S. Pat. No. 4,405,464, provides a method by which selenium, as the selenate, is chemically precipitated from the aqueous system containing the same using metallic iron. This latter process also is disclosed as being capable of removing a substantial portion of any selenium in its selenite oxidation state. This capability, alone, renders the process described in U.S. Pat. No. 4,405,464 economically more attractive, than either the ion exchange or reverse osmosis methods which have been proposed or which are currently in use.

SUMMARY OF THE INVENTION

The surprising discovery now has been made that it is possible to substantially reduce the concentration of selenium ions in the selenite and selenate oxidation states in an aqueous solution by contacting the aqueous solution with a population of bacteria contained on a porous matrix, under anaerobic conditions, said bacteria being capable of metabolically reducing said selenium ions to water insoluble selenium metal. The water insoluble selenium metal resulting from this metabolic reduction is retained on the porous matrix. The resultant aqeuous effluent is characterized by a significantly lower water soluble selenium ion concentration.

The contacting of the aqueous solution containing selenium ions with the bacteria contained on the porous matrix is carried out under anaerobic conditions and in the presence of nutrients and at temperatures and solution pHs capable of providing for the continued growth and steady state population density of the bacteria.

DETAILED DESCRIPTION OF THE INVENTION

In accordance with the present invention, a process for substantially removing selenium ions in the selenite and selenate oxidation states from aqueous solutions is provided. Aqueous solutions which can be treated in accordance with the process of this invention can include any process effluent such as, for example, water from a uranium, copper or molybdenum mining or leaching operation, mine seepage or drainage water or any other aqueous stream which contains selenium ions in the selenite, Se(IV), and selenate, Se(VI), oxidation states. To facilitate the description and understanding of the process of the present invention, specific reference hereinafter will be made to a selenium-containing aqeuous solution comprising mine discharge water, wherein the selenium ions are in both the Se(IV) and Se(VI) oxidation states.

In accordance with the process of the present invention, a mine discharge water is introduced into an anaerobic treatment zone, wherein there are populations of bacteria of the genus Clostridium supported on a porous matrix through which the mine discharge water must pass. The treatment zone can be any suitable structure, including, but not limited to, structures such as, for example, various vessels, tanks, earthen ponds and the like. Within this treatment zone, the porous matrix will be under anaerobic conditions, i.e., in the substantial absence of free atmospheric oxygen. Under such anaerobic conditions, the Clostridium bacteria, useful in the practice of this invention, metabolically reduce the selenite and selenate ions to water insoluble selenium metal, which metal is encapsulated in the cellular structure of said bacteria contained on the porous matrix. As a result of the metabolic reduction of the selenite and selenate ions to metallic selenium, the effluent exiting the treatment zone contains a significantly reduced concentration of these selenium ions compared to that of the mine discharge water entering said zone. The Clostridium family of bacteria, includes but is not limited to such species as *C. butyricum, C. pasteurianum, C. acidiurici, C. kluyveri, C. aceticum* and the like.

Various materials can be employed as the porous matrix support for the Clostridium bacteria within the treatment zone. To be useful, these matrix materials must at least posses a porosity capable of allowing passage of the mine discharge water through the treatment zone at rates of flow within the ranges set forth hereinbelow and also must be substantially inert, i.e., neither destroy the bacteria per se nor interfere with said bacteria's ability to metabolically reduce the water soluble selenium ions to water insoluble selenium metal. Representative, but non-limiting examples, of such materials include soil, sand, cellulose, glass wool, glass beads and the like. Combinations of these various materials also can be used. Particularly useful materials are soils and sand and combinations thereof.

The pH of the mine discharge water entering the treatment zone, the rate of flow of the mine discharge water through said treatment zone, the presence of nutrients in said treatment zone and the temperature of the combination of the mine water and matrix within said zone are all further parameters critical to carrying out the process of this invention. In general, the pH of the mine water entering the treatment zone be at least about 6.0 and generally will must range from about 6.0 to about 11.0 and preferably will range from about 7.0 to about 10.0. If adjustment of the pH of the mine discharge water or the environment within the treatment zone is necessary, this can be accomplished by the addition of a suitable basic or acidic material such as lime, caustic, sulfuric acid and the like to either the mine water or the treatment zone or both.

For any given rate of flow of the mine discharge water through the porous matrix, the extent of removal of selenium from said mine discharge water, through the metabolic reduction of the selenite and selenate ions therein to selenium metal, is dependent on the amount of nutrient available to the Clostridium bacteria, contained in the porous matrix, for growth and establishment of sufficiently large population densities. For example, as the amount of nutrient available to the bacteria for growth and the establishment of large population densities increases, the extent of selenium removal from the mine waters contacted with said bacteria also increases. Conversely, as the amount of nutrient decreases, the growth and population densities of the bacteria contained on the porous matrix decreases, resulting in a concomitant decrease in the amount of the water soluble selenium ions which can be removed from the mine water.

The presence of nutrients in the mine water/porous matrix environment within the treatment zone serves to provide the energy and other materials necessary for cell growth. Thus, the capacity of the bacteria to grow and maintain steady state population densities within the porous matrix is determined by said bacteria's ability to utilize the particular nutrients, including trace nutrients, present in the bacteria's surroundings. For bacteria of the genus Clostridium, nutrients having the ability to provide for the growth and steady state population densities thereof include any suitable organic carbon source as, for example, cellulose, hemicellulose, pectic substances, inulin, chitin, lignins, hydrocarbons, starches, sugars, proteins, amino acids, organic acids, derivatives of these materials and biological and municipal waste water sludges. Of these, starches, cellulose, lignin, municipal waste water sludges, sugars such as sucrose and glucose, are the preferred materials to be employed as nutrients in the process of this invention. Trace nutrients, necessary to the bacteria's growth include, for example, nitrogen, phosphorous, potassium, magnesium, sulfur, iron, calcium, manganese, zinc, copper, molybdenum, cobalt and other growth factors such as vitamins and will be added to the mine water, porous matrix or mine water/porous matrix environment within the treatment zone. Such trace nutrients can occur naturally within the materials employed as the porous matrix or the mine discharge water undergoing treatment or both. In such event, external addition of these trace nutrients will generally be unnecessary.

The amount of nutrient added to the mine water/porous matrix environment within the treatment zone will be an amount capable of providing a rate of growth for and the establishment of a large steady state population density of said Clostridium bacteria sufficient to yield an aqueous effluent having a predetermined, reduced concentration of said selenium ion. Generally, said predetermined, reduced concentration of selenium ion corresponds to at least the maximum permissible concentration level for such ion in the discharge effluent as established by either federal or state regulatory agencies for the locale in which said discharge is taking place. For example, as noted hereinabove, in the State of New Mexico, the maximum concentration level for selenium ions in mining or ore processing waste waters discharged into the groundwater systems in said state is 0.05 milligrams of said ions per liter of such waste waters. Thus, in the biological treatment of such waste waters, in accordance with the process of this invention, sufficient nutrient will be added, as needed, to the mine water/porous matrix environment in the treatment zone for the growth and establishment of large populations of Clostridium bacteria to yield an effluent containing, at most, this maximum concentration level. Determination of the need for and amount of nutrient to accomplish the above purpose readily can be made by analysis of the mine water entering the treatment zone and the effluent exiting said zone for selenium ion content. An increase in the concentration of selenium ions in the effluent stream exiting the treatment zone above the predetermined, maximum concentration level for such ions will indicate the need for additional nutrient to re-establish the growth and population density of the Clostridium bacteria contained in the porous matrix within the treatment zone. Nutrient will be added to the treatment zone until such time as at least the predetermined, maximum concentration level of selenium ions in the effluent from the treatment zone once again has been achieved.

Although the above teachings relate to the intermittent addition of nutrient to the treatment zone to provide the necessary energy for the growth and maintenance of steady state population densities of the Clostridium bacteria therein, such addition may be carried out on a continuous basis. In such event, only periodic analysis of the effluent stream exiting the treatment zone need be made to determine that the necessary growth and population densities of the bacteria are being maintained for substantial reduction of the selenium ions.

The treatment zone, in which the mine water to be treated and the porous matrix containing the Clostridium bacteria are retained, will be maintained at temperatures ranging from about 0° C. to about 65° C. and, preferably, at temperatures from about 0° C. to about 35° C. and most preferably at temperatures ranging from about 12° C. to about 35° C. This range of temperatures is critical for optimizing the growth and population densities of the Clostridium bacteria and, thus, optimization of the extent of selenium ion removal. While decreased selenium ion removal has been observed when operating at the lower end of the above indicated broad temperature range, it also has been observed that the amount of available nutrient is interrelated with the extent of selenium removal. Thus, even at the lower end of the above broad temperature range, selenium removal can be increased by providing an ample supply of nutrient to the treatment zone.

The rate of flow of the mine water into and through the treatment zone containing the porous matrix and Clostridium bacteria can range up to about 820.0 liters of said mine water per square meter of the porous matrix in said zone per day. In a preferred embodiment, this rate of flow will range from about 86.0 to about 270.0 liters of mine water per square meter of the porous matrix per day. At or within these flow rates, it has been observed that the selenium ions in the mine water being treated will have sufficient time to make contact with the Clostridium bacteria on the porous matrix and, thereby, undergo metabolic reduction to water insoluble selenium metal.

As disclosed hereinabove, the metabolic reduction of the water soluble selenium ions in the mine discharge water being treated results in the formation of water insoluble selenium metal. This selenium metal is retained on the porous matrix in the treatment zone. While the mechanism by which this metabolic reduction takes place is not fully understood, it is believed that said reduction occurs within the cellular structure of the bacteria. Therefore, it is further believed that the water insoluble selenium metal produced by this reduction is retained on the porous matrix within the cellular structure of the bacteria on said matrix.

The water insoluble selenium metal, resulting from the metabolic reduction of water soluble selenium ions in the discharge water, retained on the porous matrix can be separated therefrom and utilized in the manufacture of various valuable selenium compounds. One method for separating the water insoluble selenium metal from the matrix is to elutriate said matrix with an aqueous solution such as, for example, water or effluent previously recovered from the treatment zone. Elutriation of the porous matrix to remove the metallic selenium preferable will be carried out within the treatment zone for a time sufficient to remove substantially all of the metallic selenium from the porous matrix within said zone. The rate of flow of the aqueous solution through the treatment zone will be a rate sufficient to elutriate the metallic selenium from the porous matrix without substantially removing the matrix itself from said zone. The selenium containing eluate recovered from the porous matrix provides a source of metallic selenium suitable for use in the manufacture of various selenium products.

The following non-limiting examples are presented as being illustrative of the practice of the present invention. In these examples, all parts are by weight unless indicated otherwise.

EXAMPLE 1-4

A series of experiments is carried out to demonstrate the utility of the present invention to remove water soluble selenium ions from a mining waste water stream. In this series of experiments, the waster water stream is passed upwardly through a 2.54-centimeter diameter cylindrical shaped treatment zone which zone is loaded with a porous matrix containing naturally occurring populations of the bacterium Clostridium. In each experiment in the series, the waste water stream is passed into the treatment zone and through the porous matrix therein at a rate of flow of about 102.0 liters of said waste water stream per square meter of said matrix per day. Also, in each experiment, the pH of the waste water/porous matrix within the treatment zone is 8.0 and the temperature is maintained in the range of from about 23.8° C. to 29.4° C.

The porous matrix which is employed in Example 1 in this series is comprised of a mixture of 20.0 grams of wood sawdust (said sawdust containing cellulose, hemicellulose and lignin) as the nutrient source and 180.0 grams of a soil containing naturally occurring populations of Clostridium bacteria. The porous matrix which is employed in each of Examples 2, 3 and 4 comprises a mixture of 100.0 grams of said soil and 100.0 grams of sand. In all of these Examples, the depth of said matrices in the treatment zone is about 30.5 centimeters.

The nutrient sources which are employed in Examples 2, 3 and 4 are sucrose, potato starch and ligninsulfonate, respectively, which are added to the waste water stream at a rate of 0.7 grams of nutrient per liter of waste water. In each of these last three Examples, the nutrients are added to the waste water stream prior to such streams being introduced to the treatment zone. However, in order to further demonstrate the dramatic effect that the nutrient has on the removal of water soluble selenium ions by the bacteria on the porous matrix, nutrient addition is not commenced until the 13th day of operation of the treatment zone in Examples 2 and 3.

The formation of metallic selenium in all of these experiments is confirmed by the brick red color developed by the bacteria which color is due to the formation of red amorphous selenium metal. Separate ESCA (Electron Spectroscopy for Chemical Analysis) studies of the porous matrices confirms the presence of metal selenium thereon.

Table I below sets forth data relating to the above described series of Examples. From the data in Table I, it is evident that the concentration of water soluble selenium ions in a mine waste water stream can be significantly reduced through the use of the process as described and claimed herein.

TABLE I

| Days of Operation | Effluent Selenium Concentration, mg/l | | | |
|---|---|---|---|---|
| | Experiment No. 1 | Experiment No. 2 | Experiment No. 3 | Experiment No. 4 |
| 0 | 1.300 | 1.600 | 1.600 | 1.600 |
| 6 | 0.088 | — | — | 0.093 |
| 7 | — | 1.600 | 1.590 | — |
| 9 | 0.074 | — | — | — |
| 11 | — | 1.598 | 1.678 | — |
| 13 | 0.045 | (a) | (a) | 0.061 (b) |
| 17 | 0.001 | 0.053 | 0.047 | — |
| 24 | 0.002 (b) | — | — | — |
| 25 | — | 0.010 | — | — |
| 31 | — | 0.007 (b) | — | — |
| 39 | — | — | 0.025 (b) | — |

(a) Nutrient addition commenced.
(b) Experiments terminated at this point.

EXAMPLE 5

A quantity of a mine discharge water, having a solution pH of 8.0 and containing 1.6 milligrams of water soluble ionic selenium species per liter of said discharge water, is added to a 5.08 centimeters diameter cylindrical treatment zone filled with glass wool as a porous matrix. The glass wool fills the treatment zone to a depth of 7.62 centimeters. To the treatment zone then is added 10 milliliters of a solution containing bacteria of the genus Clostridium and a nutrient solution of glucose at a concentration of 0.36 grams of glucose per liter of mine water. The treatment zone is then allowed to sit for a period of time sufficient to permit the growth and attainment of steady state population densities of the Clostridium bacteria on the glass wool matrix.

At the end of this time, operation of the treatment zone is commenced by the addition of fresh mine discharge water to, and removal of treated effluent from, the treatment zone. The addition of fresh mine water and removal of treated effluent are carried out at rates sufficient to permit the passage of the mine water through the porous matrix at a rate of 146.7 liters of said mine water per square meter of porous matrix per day. Operation of the treatment zone is continued for a period of 56 days. During this period of time, mine discharge waters containing different concentrations of water soluble ionic selenium species and to which are added various nutrients in varying concentrations are employed. The treatment zone is maintained under anaerobic conditions during the entire operating period. Data for this Example 5 are presented in Table II below. From this Table II, it is clear that inert material, such as glass wool, can be inoculated with populations of Clostridium bacteria and employed as a porous matrix in the practice of this invention. The data in Table II also demonstrate that various materials will function as nutrients for the growth and maintenance of steady state population densities of bacteria sufficient to effect metabolic reduction of the water soluble selenium ions in the mine water and provide an effluent having a substantially reduced concentration of said water soluble selenium ion.

TABLE II

| Days of Operation | Effluent Selenium Concentration, mg/l | Remarks |
|---|---|---|
| 1 | 0.685 | Feed water charge contains 1.6 mg/l Se ion and 0.36 gm/l glucose |
| 6 | 0.424 | |
| 8 | 0.225 | |
| 12 | 0.116 | Feed water changed to one containing 1.6 mg/l of Se ion and O.1 gm/l of nutrient broth (a) |
| 18 | 0.049 | |
| 20 | 0.125 | Feed water changed to one containing 1.3 mg/l of Se ion and 0.5 gm/l starch |
| 22 | 0.208 | |
| 26 | 0.285 | |
| 32 | 0.043 | |
| 40 | 0.361 | |
| 42 | 0.042 | Feed water changed to one containing 1.3 mg/l of Se ion and 0.7 gm/l sucrose |
| 48 | 0.201 | |
| 49 | 0.289 | |
| 53 | 0.034 | |
| 56 | 0.031 | |

(a) Nutrient broth comprised of a commercially obtained mixture of peptone and beef extract.

While the invention herein has been described and illustrated in terms of what at present are to believed to be the preferred embodiment, it is to be understood that this invention is not to be limited to these specific embodiments and that change thereto may be made without departing from the spirit and scope thereof except as provided in the following claims.

What is claimed is:

1. A process for reducing the concentration of water soluble selenium ions in an aqueous solution containing the same comprising:

providing an aqeuous solution containing water soluble selenium ions, said aqueous solution having a pH of at least about 6.0;

providing a porous matrix containing a population of bacteria comprising anaerobic bacteria of the genus Clostridium, said bacteria being capable of metabolizing said selenium ions to water insoluble selenium metal, said matrix being under anaerobic conditions; and passing said aqueous solution through said porous matrix in the presence of nutrients and at predetermined temperatures, said nutrients and said temperatures providing for the growth and steady state population density of said bacteria, to contact the selenium ions in said aqueous solution with the bacteria contained in the porous matrix whereby said bacteria metabolically reduce at least a portion of the water soluble selenium ions to water insoluble selenium metal, which metal is substantially retained on the porous matrix, and to produce an aqueous effluent having a reduced concentration of said water soluble selenium ions.

2. The process of claim 1 wherein the selenium ions in said aqeous solution are in the Se(IV) and Se(VI) oxidation states.

3. The process of claim 1 wherein the pH of the aqueous solution containing said selenium ions ranges from about 6.0 to about 11.0.

4. The process of claim 1 wherein said water insoluble selenium metal, substantially retained on the porous matrix, is encapsulated within the bacteria contained on said matrix.

5. The process of claim 1 wherein said aqueous solution is continuously passed through said porous matrix at a rate up to about 820 liters of the aqueous solution per square meter of the porous matrix per day.

6. The process of claim 5 wherein the passing of said aqueous solution through said porous matrix containing said bacteria is carried out in the presence of at least one nutrient comprising an organic carbon source and in the presence of at least one trace nutrient.

7. The process of claim 6 wherein said nutrient comprising an organic carbon source is at least one material selected from the group consisting of cellulose, hemicellulose, pectic substances, inulin, chitin, lignin, hydrocarbons, starches, sugars, proteins, amino acids, organic acids, derivatives of said materials and biological and municipal waste water sludges.

8. The process of claim 7 wherein the passing of said aqueous solution through said porous matrix containing said bacteria in the presence of said nutrient is carried out at a temperature ranging from about 0° C. to about 65° C.

9. The process of claim 5 further comprising continuously separating from said porous matrix an aqueous effluent containing a significantly reduced concentration of said water soluble selenium ions.

10. The process of claim 1 further comprising, separating and recovering from said porous matrix said water insoluble selenium metal.

11. A continuous process for substantially reducing the concentration of water soluble selenium ions in an aqueous solution containing the same comprising:
providing an aqueous solution containing said selenium ions in the Se(IV) and Se(VI) oxidation states, said solution having a pH ranging from about 6 to about 11;
providing a porous matrix containing populations of Clostridium bacteria, said bacteria being capable of metabolizing said selenium ions to water insoluble selenium metal, said matrix and bacteria being under anaerobic conditions;
continuously passing said aqueous solution through said porous matrix at a rate of flow up to about 820 liters of the aqueous solution per square meter of the porous matrix per day, in the presence of at least one nutrient comprising an organic carbon source wherein said nutrient is at least one material selected from the group consisting of cellulose, hemicellulose, pectic substances, inulin, chitin, hydrocarbons, starches, sugars, proteins, amino acids, organic acids, derivatives of said materials and biological and municipal waste water sludges and in the presence of at least one trace nutrient at a temperature ranging from about 0° C. to about 65° C., said nutrient and said temperature providing for the growth and steady state population density of the bacteria on said matrix, to contact said selenium ions with said Clostridium bacteria and thereby metabolically reduce said soluble selenium ions to water insoluble selenium metal, which is encapsulated in said bacteria contained on the porous matrix; and
continuousy separating from said porous matrix an aqueous effluent containing a significantly reduced concentration of said water soluble selenium ions.

12. The process of claim 11 further comprising, separating and recovering from said porous matrix said water insoluble selenium metal.

13. The proces of claim 11 wherein said aqueous solution is a mine discharge water.

14. The process of claim 13 wherein the pH of said mine discharge water ranges from about 7.0 to about 10.0.

15. The process of claim 11 wherein said porous matrix is comprised of at least a porous soil, said soil naturally containing said populations of Clostridium bacteria and said soil being contained in a treatment zone under anaerobic conditions.

16. The process of claim 15 wherein said aqueous solution is continuously passed through said porous matrix, contained in said treatment zone under anaerobic conditions, at a rate of flow ranging from about 86.0 to about 270 liters of aqueous solution per square meter of the porous matrix per day.

17. The process of claim 16 wherein the passing of said aqueous solution through said porous matrix in said treatment zone is carried out in the presence of at least one nutrient comprising an organic carbon source, said nutrient being at least one material selected from the group consisting of sucrose, glucose, starch, lignin, derivatives of said sucrose, glucose, starch and lignin, and municipal waste water sludges.

18. The process of claim 17 wherein the passing of said aqueous solution through said porous matrix in said treatment zone is carried out at a temperature ranging from about 0° C. to about 35° C. and preferably ranging from about 12° C. to about 35° C.

19. The process of claim 11 wherein the aqueous effluent separated from said porous matrix contains no more than about 0.05 milligrams of water soluble selenium ions per liter of the aqueous effluent.

* * * * *